(12) United States Patent
Jafarkhani et al.

(10) Patent No.: US 7,599,419 B2
(45) Date of Patent: Oct. 6, 2009

(54) METHOD AND APPARATUS FOR USE OF SPACE TIME TRELLIS CODES BASED ON CHANNEL PHASE FEEDBACK

(75) Inventors: Hamid Jafarkhani, Irvine, CA (US); Li Liu, Aliso Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 558 days.

(21) Appl. No.: 11/332,019

(22) Filed: Jan. 12, 2006

(65) Prior Publication Data

US 2006/0176977 A1    Aug. 10, 2006

Related U.S. Application Data

(60) Provisional application No. 60/644,076, filed on Jan. 14, 2005.

(51) Int. Cl.
 *H04B 1/00* (2006.01)
(52) U.S. Cl. ............... 375/137; 375/135; 375/229; 375/261; 375/265; 375/267
(58) Field of Classification Search ............... 375/135, 375/137, 229, 261, 265, 267
See application file for complete search history.

(56) References Cited

U.S. PATENT DOCUMENTS

| | | | |
|---|---|---|---|
| 5,659,578 | A | 8/1997 | Alamouti et al. |
| 6,359,935 | B1 | 3/2002 | Hui et al. |
| 6,445,747 | B1 | 9/2002 | Jafarkhani et al. |
| 6,629,287 | B1 * | 9/2003 | Brink ............... 714/755 |
| 2001/0006519 | A1 | 7/2001 | Voit |
| 2002/0051499 | A1 * | 5/2002 | Cameron et al. ........... 375/295 |
| 2002/0090035 | A1 | 7/2002 | Seshadri et al. |
| 2003/0223507 | A1 * | 12/2003 | De Gaudenzi et al. ...... 375/279 |
| 2004/0057530 | A1 * | 3/2004 | Tarokh et al. .............. 375/267 |
| 2004/0071223 | A1 * | 4/2004 | Ko et al. .................... 375/267 |
| 2004/0120411 | A1 * | 6/2004 | Walton et al. .............. 375/260 |
| 2005/0020215 | A1 * | 1/2005 | Hottinen .................... 455/101 |
| 2006/0114858 | A1 * | 6/2006 | Walton et al. .............. 370/335 |
| 2007/0183527 | A1 * | 8/2007 | Jia et al. .................... 375/267 |

OTHER PUBLICATIONS

Jafarkhani, "Super-Quasi-Orthogonal Space-Time Trellis Codes for Four Transmit Antennas", Jul. 1, 2003.*

(Continued)

*Primary Examiner*—Juan A Torres
(74) *Attorney, Agent, or Firm*—Daniel L. Dawes; Marcus C. Dawes

(57) ABSTRACT

A method for multiple-input-multiple-output (MIMO) wireless communication comprises the steps of generating inner and outer codes based on channel state information available at a transmitter and concatenating different inner codes with different outer codes; and using the generated concatenated inner and outer codes for wireless communication. The inner and outer codes are based on channel phase information at the transmitter or channel feedback. High-performance trellis codes or block codes for use in cellular networks are illustratively described. The space-time trellis codes are generated by set partitioning on a plurality of classes of signal designs to generate a series of inner codes, each of the series of inner codes being optimized by channel phase feedback, and concatenating each inner code with a multiple trellis coded modulated outer code to provide a complete space-time trellis code as a cophase space-time trellis code.

12 Claims, 7 Drawing Sheets

OTHER PUBLICATIONS

Wang "Space-Time Trellis Code Design Based on Super Quasi-Orthogonal Block Codes with Minimum Decoding Complexity," Aug. 30, 2004 (see http://www.ece.udel.edu/%7Edwang/SQOSTTC-long.pdf and http://www.ece.udel.edu/%7Edwang/?C=M).*

Vaze "High-rate STBC-MTCM schemes for quasi-static and block-fading channels" Global Telecommunications Conference, 2004. GLOBECOM '04, IEEE, Publication Date: Nov. 29-Dec. 3, 2004, vol. 1, On pp. 535-539 vol. 1.*

Knopp, "Power control schemes for TDD systems with multiple transmit and receive antennas" 1999 Proceedings of IEEE Global Telecommunications Conference Rio de Janeiro, Brazil, pp. 2326-2330.*

Barbarossa, "Optimal precoding for transmissions over linear time-varying channels", 1999 Proceedings of IEEE Global Telecommunications Conference Rio de Janeiro, Brazil, pp. 2545-2549.*

Lai, "Adaptive trellis coded MQAM and power optimization for OFDM transmission", Proceedings of the 1999 IEEE Vehicular Technology Conference, Houston, USA, pp. 290-294.*

Pan, "Analysis of Multiuser MIMO Downlink Networks Using Linear Transmitter and Receivers", EURASIP Journal on Wireless Communications and Networking 2004:2, 248-260 (available at http://dx.doi.org/10.1155/S1687147204406045 ).*

Mucchi, "Space-Time in Radio Communications", EURASIP Journal on Wireless Communications and Networking 2004:, 7-22 (available at http://www.eurasip.org/newsletter/newsletter-15-4.pdf ).*

Gozali, "Space-Time Codes for High Data Rate Wireless Communications", 2002 (can be found at http://scholar.lib.vt.edu/theses/available/etd-04242002-155825/unrestricted/Dissertation.pdf ).*

Molisch, "MIMO systems with antenna selection", Microwave Magazine, IEEE vol. 5, Issue 1, Mar. 2004 pp. 46-56.*

Tarokh, "Space-time codes for high data rate wireless communication: performance criterion and code construction," IEEE Trans. Inform. Theory, vol. 44, No. 2, pp. 744-765, Mar. 1998. (see http://ieeexplore.ieee.org/stamp/stamp.jsp?tp=&arnumber=661517).*

Jafarkhani, "Super-orthogonal space-time trellis codes," IEEE Transaction on Information Theory, vol. 49, No. 4, pp. 937-950, Apr. 2003. (see http://ieeexplore.ieee.org/stamp/stamp.jsp?arnumber=01193802).*

Siwamogsatham, "Improved high rate space-time codes via orthogonality and set partitioning," in Proc. IEEE Wireless Communications and Networking Conf. (WCNC), vol. 1, pp. 264-270,Mar. 2002 (see http://ieeexplore.ieee.org/stamp/stamp.jsp?tp=&arnumber=993504&isnumber=21425).*

Siwamogsatham, "Improved high rate space-time codes via concatenation of expanded orthogonal block code and M-TCM," in IEEE International Conf. on Communications (ICC), vol. 1, pp. 636-640, Apr. 2002 (see http://ieeexplore.ieee.org/stamp/stamp.jsp?arnumber=00996930).*

Jafarkhani, "Super-quasi-orthogonal space-time trellis codes for four transmit antennas," IEEE Trans. on Wireless Communications, Jan. 2005 vol. 4 No. 1 (see http://ieeexplore.ieee.org/stamp/stamp.jsp?arnumber=01381439).*

Alamouti, "A simple transmit diversity technique for wireless communications," IEEE Journal Select Areas Communications, vol. 16, No. 8, pp. 1451-1458, Oct. 1998 (see http://ieeexplore.ieee.org/stamp/stamp.jsp?tp=&arnumber=730453).*

Tarokh, "Space-time block codes from orthogonal designs," IEEE Trans. Inform. Theory, vol. 45, No. 5, pp. 1456-1467, Jul. 1999 (see http://ieeexplore.ieee.org/stamp/stamp.jsp?tp=&arnumber=771146).*

Jongren, "Combining beamforming and orthogonal space-time block coding," IEEE Trans. Inform. Theory, vol. 48, No. 3, pp. 611-627, Mar. 2002 (http://ieeexplore.ieee.org/stamp/stamp.jsp?arnumber=00985950).*

Zhou, "Optimal transmitter eigen-beamforming and space-time block coding based on channel mean feedback," IEEE Trans. Signal Processing, vol. 50, No. 10, pp. 2599-2613, Oct. 2002 (http://ieeexplore.ieee.org/stamp/stamp.jsp?arnumber=01033689).*

Liu, "Combining beamforming and quasiorthogonal space-time block coding using channel mean feedback," in Proc. IEEE Global Telecommunications Conf. (GLOBECOM), vol. 4, pp. 1925-1930, Dec. 2003 (see http://ieeexplore.ieee.org/stamp/stamp.jsp?arnumber=01258573.*

Zhou, "Optimal transmitter eigen-beamforming and space-time block coding based on channel correlations," IEEE Trans. Inform. Theory, vol. 49, No. 7, pp. 1673-1690, Jul. 2003 (see http://ieeexplore.ieee.org/stamp/stamp.jsp?arnumber=01207368.*

Narula, "Efficient use of side information in multiple-antenna data transmission over fading channels," IEEE J. Select. Areas Commun., vol. 16, No. 8, pp. 1423-1436, Oct. 1998 (http://ieeexplore.ieee.org/stamp/stamp.jsp?arnumber=00730451).*

International Searching Authority (ISA/US), International Search Report and Written Opinion dated Jul. 23, 2007, 11 pages.

* cited by examiner

| L=1 $L_1=1, L_2=0, L_3=0$ | | L=2 $L_1=1, L_2=0, L_3=1$ | |
|---|---|---|---|
| $C(c_1,c_2,c_3,c_4,-b_2\pi,0,0)$ | $S_0\ S_1$ | $E(c_1,c_2,c_3,c_4,-b_2\pi,-b_3\pi,0)$ | $S_0\ S_1$ |
| $C(c_1,c_2,c_3,c_4,-b_2\pi,\pi,0)$ | $S_1\ S_0$ | $E(c_1,c_2,c_3,c_4,-b_2\pi,-b_3\pi,\pi)$ | $S_1\ S_0$ |
| L=3 $L_1=2, L_2=0, L_3=1$ | | L=4 $L_1=2, L_2=2, L_3=0$ | |
| $E(c_1,c_2,c_3,c_4,-b_2\frac{\pi}{2},-b_3\pi,0)$ | $S_0\ S_1$ | $D(c_1,c_2,c_3,c_4,-b_2\frac{\pi}{2},-b_3\frac{\pi}{2},0)$ | $S_0\ S_1$ |
| $E(c_1,c_2,c_3,c_4,-b_2\frac{\pi}{2},-b_3\pi,\pi)$ | $S_1\ S_0$ | $D(c_1,c_2,c_3,c_4,-b_2\frac{\pi}{2},-b_3\frac{\pi}{2},\pi)$ | $S_1\ S_0$ |
| L=5 $L_1=2, L_2=2, L_3=1$ | | L=6 $L_1=2, L_2=2, L_3=2$ | |
| $B(c_1,c_2,c_3,c_4,-b_2\frac{\pi}{2},-b_3\frac{\pi}{2},-b_4\pi)$ | $S_0\ S_1$ | $B(c_1,c_2,c_3,c_4,-b_2\frac{\pi}{2},-b_3\frac{\pi}{2},-b_4\frac{\pi}{2})$ | $S_0\ S_1$ |
| $D(c_1,c_2,c_3,c_4,-b_2\frac{\pi}{2},-b_3\frac{\pi}{2},0)$ | $S_1\ S_0$ | $D(c_1,c_2,c_3,c_4,-b_2\frac{\pi}{2},-b_3\frac{\pi}{2},0)$ | $S_1\ S_0$ |

(A) TWO-STAE CODES

FIG. 8A

| L=1 $L_1=1, L_2=0, L_3=0$ | | L=2 $L_1=1, L_2=0, L_3=1$ | |
|---|---|---|---|
| $C(c_1,c_2,c_3,c_4,-b_2\pi,0,0)$ | $S_0\ S_1$ | $E(c_1,c_2,c_3,c_4,-b_2\pi,-b_3\pi,0)$ | $S_0\ S_1$ |
| $C(c_1,c_2,c_3,c_4,-b_2\pi,\pi,0)$ | $S_0\ S_1$ | $E(c_1,c_2,c_3,c_4,-b_2\pi,-b_3\pi,\pi)$ | $S_0\ S_1$ |
| $C(c_1,c_2,c_3,c_4,-b_2\pi,0,0)$ | $S_1\ S_0$ | $E(c_1,c_2,c_3,c_4,-b_2\pi,-b_3\pi,0)$ | $S_1\ S_0$ |
| $C(c_1,c_2,c_3,c_4,-b_2\pi,\pi,0)$ | $S_1\ S_0$ | $E(c_1,c_2,c_3,c_4,-b_2\pi,-b_3\pi,\pi)$ | $S_1\ S_0$ |
| L=3 $L_1=2, L_2=0, L_3=1$ | | L=4 $L_1=2, L_2=2, L_3=0$ | |
| $E(c_1,c_2,c_3,c_4,-b_2\frac{\pi}{2},-b_3\pi,0)$ | $S_0\ S_1$ | $D(c_1,c_2,c_3,c_4,-b_2\frac{\pi}{2},-b_3\frac{\pi}{2},0)$ | $S_0\ S_1$ |
| $E(c_1,c_2,c_3,c_4,-b_2\frac{\pi}{2},-b_3\pi,\pi)$ | $S_0\ S_1$ | $D(c_1,c_2,c_3,c_4,-b_2\frac{\pi}{2},-b_3\frac{\pi}{2},\pi)$ | $S_0\ S_1$ |
| $E(c_1,c_2,c_3,c_4,-b_2\frac{\pi}{2},-b_3\pi,0)$ | $S_1\ S_0$ | $D(c_1,c_2,c_3,c_4,-b_2\frac{\pi}{2},-b_3\frac{\pi}{2},0)$ | $S_1\ S_0$ |
| $E(c_1,c_2,c_3,c_4,-b_2\frac{\pi}{2},-b_3\pi,\pi)$ | $S_1\ S_0$ | $D(c_1,c_2,c_3,c_4,-b_2\frac{\pi}{2},-b_3\frac{\pi}{2},\pi)$ | $S_1\ S_0$ |
| L=5 $L_1=2, L_2=2, L_3=1$ | | L=6 $L_1=2, L_2=2, L_3=2$ | |
| $B(c_1,c_2,c_3,c_4,-b_2\frac{\pi}{2},-b_3\frac{\pi}{2},-b_4\pi)$ | $S_0\ S_1$ | $B(c_1,c_2,c_3,c_4,-b_2\frac{\pi}{2},-b_3\frac{\pi}{2},-b_4\frac{\pi}{2})$ | $S_0\ S_1$ |
| $D(c_1,c_2,c_3,c_4,-b_2\frac{\pi}{2},-b_3\frac{\pi}{2},0)$ | $S_0\ S_1$ | $D(c_1,c_2,c_3,c_4,-b_2\frac{\pi}{2},-b_3\frac{\pi}{2},0)$ | $S_0\ S_1$ |
| $B(c_1,c_2,c_3,c_4,-b_2\frac{\pi}{2},-b_3\frac{\pi}{2},-b_4\pi)$ | $S_1\ S_0$ | $B(c_1,c_2,c_3,c_4,-b_2\frac{\pi}{2},-b_3\frac{\pi}{2},-b_4\frac{\pi}{2})$ | $S_1\ S_0$ |
| $D(c_1,c_2,c_3,c_4,-b_2\frac{\pi}{2},-b_3\frac{\pi}{2},0)$ | $S_1\ S_0$ | $D(c_1,c_2,c_3,c_4,-b_2\frac{\pi}{2},-b_3\frac{\pi}{2},0)$ | $S_1\ S_0$ |

(A) FOUR-STAE CODES

FIG. 8B

METHOD AND APPARATUS FOR USE OF SPACE TIME TRELLIS CODES BASED ON CHANNEL PHASE FEEDBACK

RELATED APPLICATIONS

The present application is related to U.S. Provisional Patent Application, Ser. No. 60/644,076, filed on Jan. 14, 2005, which is incorporated herein by reference and to which priority is claimed pursuant to 35 USC 119.

BACKGROUND OF THE INVENTION

1. Field of the Invention

The invention relates to methods of design high-performance codes for the multiple-input-multiple-output MIMO wireless communication systems and the apparatus which use them.

2. Description of the Prior Art

For wireless communication systems, many codes have been devised to combat channel fading. However, many of these coding schemes were developed for single-transmit/receive-antenna systems, which cannot be directly applied to the recent multiple-input-multiple-output (MIMO) wireless systems. It is still an open problem to find good codes that can take full advantage of multiple transmit/receive antennas.

In the recent years, some concatenated codes were presented for open-loop MIMO systems. Several block codes have been designed based on channel mean/covariance information at the transmitter. Block code is an error detection and/or correction code in which the encoded block consists of N symbols, containing K information symbols (K<N) and N-K redundant check symbols, such that most naturally occurring errors can be detected and/or corrected.

More specifically, space-time trellis codes (STTCs) have been introduced to provide improved error performance for wireless systems using multiple transmit antennas. Space-time block codes operate on a block of input symbols producing a matrix output whose columns represent time and rows represent antennas. Unlike traditional single antenna block codes for the additive white Gaussian noise (AWGN) channel, most space-time block codes do not provide coding gain. Coding gain refers to the improvement in decibels (dB) that a particular code offers over other option. An improvement in coding gain can provide the designer with options such as reducing transmission power or bandwidth. Their key feature is the provision of full diversity with extremely low encoder/decoder complexity. Diversity is the property of being made up of two or more different elements, media, or methods. Diversity gain is the ratio of the signal field strength obtained by diversity combining to the signal strength obtained by a single path. Diversity gain is usually expressed in dB. In addition, they are optimal over all unitary codes with respect to the union bound on error probability. The best known codes for real constellations have been designed for a practical range of transmit antennas (2 to 8).

Space-time trellis codes operate on one input symbol at a time producing a sequence of vector symbols whose length represents antennas. Like traditional trellis coded modulation (TCM) for the single-antenna channel, space-time trellis codes provide coding gain. Since they also provide full diversity gain, their key advantage over space-time block codes is the provision of coding gain. Their disadvantage is that they are extremely difficult to design and require a computationally intensive encoder and decoder.

It was shown that, for an open-loop system, where only the receiver has full knowledge of the channel, the rank and determinant of the pair wise codeword difference matrix determine the coding gain of the corresponding space time trellis code. If the pair wise codeword difference matrix is full rank, full spatial diversity is obtained.

Recently, the original space time trellis codes in have been enhanced by the super-orthogonal space time trellis codes (SOSTTC), and the super-quasi-orthogonal space time trellis codes (SQOSTTC). In these new trellis codes, a standard multiple trellis coded modulation (M-TCM) encoder serves as the outer encoder, while the space-time block codes (ST-BCs), or the quasi-orthogonal space time block codes (QOSTBCs), are used as building blocks for the inner codes. Multiple trellis coded modulation (MTCM) is trellis code in which each trellis branch corresponds to multiple symbol transmissions from each transmit antenna. The super orthogonal space time trellis code and super quasi-orthogonal space time trellis code enjoy full spatial diversity, higher coding gain, as well as simple implementation.

The space-time coding schemes mentioned above do not exploit the channel knowledge at the transmitter. However, it is clear that with additional channel state information (CSI), the space-time transmission could be further improved.

STBC beam forming schemes have been proposed based on the channel mean or covariance feedback. The schemes use precoding matrices which are constructed based on imperfect feedback of the mean or covariance of a complex Gaussian channel. Nevertheless, these schemes use complicated eigen-analysis to construct the optimal precoding matrices. In addition, the resulting beam forming matrix accomplishes optimal power loading, thus it normally incurs a high peak to average power ratio (PAPR) at the transmitter, which significantly increases the complexity and cost of the system. It may be difficult to implement these beam forming schemes in practical digital communication systems.

Besides these STBC-based beam forming schemes, there are several other schemes that are based on traditional one-dimensional beam forming. Among them, a very promising scheme is the co-phase transmission (CPT) scheme. In cophase transmission, the relative channel phase information is uniformly quantized and sent back to the transmitter. On the transmit side, a rotation vector is applied to the transmission symbol. The rotation vector is constructed such that the signals from the different transmit antennas are added coherently at the receiver antenna, thus the receive signal to noise ratio (SNR) is maximized. The major advantage of cophase transmission is its easy implementation. With only a few feedback bits, significant performance improvement is attained. On the other hand, unlike the space time trellis code schemes, the original cophase transmission scheme does not provide any coding gain from the space-time transmission.

In the prior art, the channel state information has not been used to design concatenated codes for multiple-input multiple-output (MIMO) communication systems. Furthermore, the design criterions in the prior art are developed based on channel mean/covariance information. However, what is needed is a coding scheme for MIMO wireless communication which is not subject to the foregoing limitations of the prior art.

BRIEF SUMMARY OF THE INVENTION

The illustrated embodiment of the invention generates optimal inner codes and outer codes for a concatenated code. Meanwhile a new design criterion is introduced based on channel phase information at the transmitter. The illustrated embodiment is thus directed to a method for code design in wireless communication systems and an apparatus which uses this code design. These new codes are constructed by concatenating different inner codes with different outer codes. Good inner and outer codes are obtained based on the channel state information available at the transmitter.

We also introduce a design criterion for designing new codes based on channel phase information at the transmitter. This criterion can be used to design high-performance trellis codes and block codes.

With the above design criterion and design method, we present some codes that are suitable for multiple-input-multiple-output (MIMO) wireless communication systems. These codes, including trellis codes and block codes, enjoy superior error performance and simple implementation. Based on the method and criterion, several high-performance codes are constructed by concatenating different inner codes with different outer codes. Good inner codes and outer codes are obtained based on the channel state information available at the transmitter and a new design criterion based on channel phase feedback. The fundamental principle is to use the channel state information at the transmitter to aid the code design.

Compared to the prior art, the codes of the invention enjoy either superior error performance, or simpler implementation, or both. This invention is intended for use in MIMO wireless communication systems, and is useful for wireless communication system design, such as the next-generation cellular networks.

What is disclosed is a new class of low-complexity space time trellis codes that combine the benefits of the coding gain from space-time coding and the maximum ratio combining gain from the channel phase feedback. To accomplish this goal, a new performance criterion is derived that takes the channel phase feedback into consideration. This new performance criterion is then used to perform set partitioning on several classes of signal designs. From the set partitioning results, we construct a series of inner codes. Each inner code is one of the most three favorable for one case of channel phase feedback. Finally, the newly designed inner codes are concatenated with a standard M-TCM outer code to obtain the complete space time trellis code. Since the proposed codes combine the advantage from both the space time trellis codes and the cophase transmission scheme, we name our new codes cophase space time trellis codes (CPSTTC).

In the detailed description below we disclose the new performance criterion based on the channel phase feedback. We disclose the set partitioning of the different signal designs. Based on the set partitioning results, we demonstrate how to systemically design cophase space time trellis codes for a system with two transmitting antennas. We also provide a systematic approach to evaluate the coding gain for different cophase time trellis codes. Then we extend our method of designing cophase time trellis codes to systems with more than two transmit antennas. Finally, we present simulation results.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 8a and 8b are tables showing 1 bit/s/Hz cophase space-time trellis code for four transmit antennas using BPSK constellation. FIG. 8a is a table listing two-state codes and FIG. 8b is a table listing four-state codes.

Figure 1:
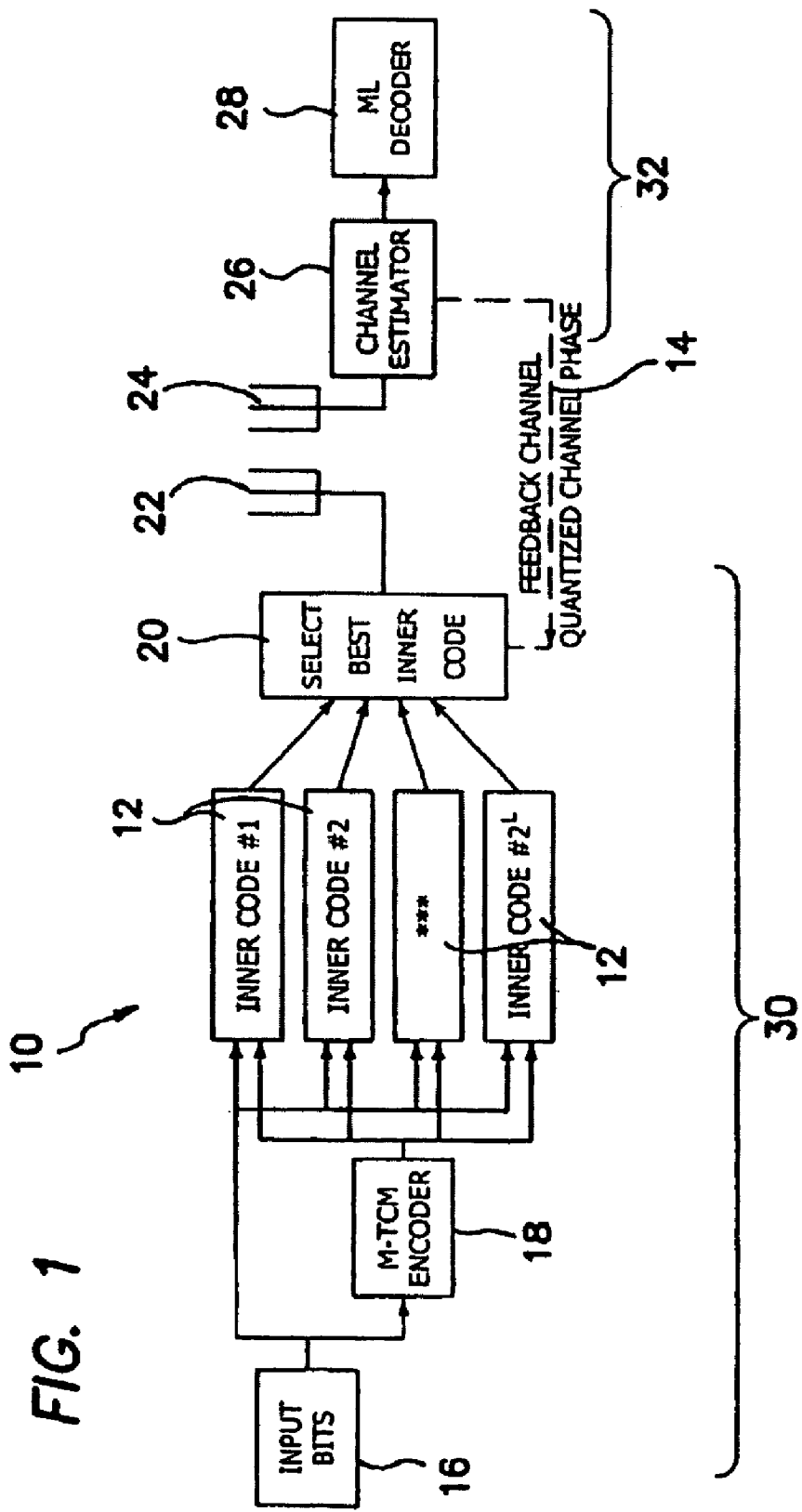
FIG. 1 is a structural block/flow diagram of the code generation method of the illustrated embodiment.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In the following disclosure: bold uppercase (lowercase) letters denote matrices (vectors); $(\blacksquare)^*$, $(\blacksquare)^T$, $(\blacksquare)^H$ denote conjugate, transpose, and Hermitian, respectively; $[X]_{ij}$ denotes the element at the ith row and jth column of X; $P(\blacksquare)$, $E(\blacksquare)$, and $cov(\blacksquare)$ stand for probability density function (pdf), mean, and covariance of a random variable, respectively; $D(x)$ stands for a diagonal matrix with x on its main diagonal; and $\delta ij$ denotes the discrete Dirac function, i.e. $\delta ii=1$ and $\delta ij=0$ for $i \neq j$.

Space-time coding has been proposed recently for the MIMO wireless communication systems. Most of the proposed space-time coding schemes use the assumption that either no channel state information, or that the channel mean/covariance information is available at the transmitter 30. In this disclosure, we propose a space-time coding scheme for a closed-loop transmission system, where quantized channel phase information is available at the transmitter 30.

A performance criterion is derived for the quasi-static fading channel. This design criterion is then used to construct a new class of space-time trellis codes. The proposed code construction is based on the concatenation of a standard M-TCM outer code with an inner code. The inner code is selected from a series of inner codes using the channel phase feedback. The series of inner codes are constructed based on the systematic set partitioning of several classes of space-time signal designs.

Simulation results show significant performance improvement over the other space-time trellis codes in the prior art. In addition, the proposed coding scheme enjoys low peak-to-average power ratio, simple decoding, and easy implementation without complicated eigen-analysis.

Performance Criterion

Consider a system with M transmit antennas in the base station and a single receive antenna in the mobile station. We adopt a quasi-static Rayleigh fading model in the analysis in the illustrated embodiment, but the nature of channel fading is not a limitation of the invention. For a space-time codeword that lasts T symbol periods, the receive signal y is given by $$y = (y_1, \ldots, y_T) = hC + n \quad (1)$$

where the components of the channel vector $h = (h_1, \ldots, h_M)$ are samples of a zero-mean complex Gaussian process with the common covariance $cov(h_i, h_j) = \sigma^2 \delta_{ij}$, for all i, j, and the noise vector $n = (n_1, \ldots, n_T)$ contains entries drawn from a zero-mean white complex Gaussian process with $cov(n_i, n_j) = \sigma^2 \delta_{ij}$, for all i, j. The transmitted space-time codeword is $C = (c_{mt}, m=1, \ldots, M, t=1, \ldots, T)$ and $c_{mt}$ is the symbol transmitted at the mth transmit antenna at time t.

The object of the illustrated embodiment is to use the channel phase information at the transmitter 30 to design a proper code to realize better error performance. We first define a simple quantized feedback scheme. The feedback information is in the vector form of $\tilde{b} = (\tilde{b}_m, m=2, \ldots, M)$. Each entry $\tilde{b}_m$ uniformly quantizes the phase of $h_m - h_1$, $m = 2, \ldots, M$. The value of $\tilde{b}_m$ is an four integer satisfying $0 \leq \tilde{b}_m \leq 2^{L_m} - 1$ and is represented by $L_m$ binary bits. Overall, there are $L = L_2 + L_3 + \ldots + L_m$ feedback bits. Using polar coordination, the channel coefficients can be expressed as $h = rD(\exp(j\theta))\underline{\Delta}[r_1, \ldots, r_M]D([e^{j\theta_1}, \ldots, e^{j\theta_M}])$.

Now we define the phase difference between two distinct transmit antennas as $\theta_{ij} \underline{\Delta} \theta_i - \theta_j$, and the phase difference vector as $\bar{\theta} \underline{\Delta} [0, \theta_{21}, \ldots, \theta_{M1}]$. Since the channel path gain $h_i$ and $h_j$ are independent from each other when $i \neq j$, straightforward derivation yields $$P(\theta_m) = \frac{1}{2\pi}, m = 1, \ldots, M, \quad (2)$$

$$P(\theta_{m1} \mid \hat{b}) = \frac{2^{L_m}}{2\pi}, m = 2, \ldots, M, \quad (3)$$

$$P(\theta \mid \hat{b}) = P(\theta_1)P(\bar{\theta} \mid \hat{b}) = P(\theta_1)\prod_{m=2}^{M} P(\theta_{m1} \mid \hat{b}), \quad (4)$$

where $\theta_m \in [0, 2\pi)$ for $1 \leq m \leq M$, and $\theta_{m1} \in$ $$\left[\psi_m + \frac{2\hat{b}_m - 1}{2^{L_m}}\pi, \psi_m + \frac{2\hat{b}_m + 1}{2^{L_m}}\pi\right) \text{ for } 2 \leq m \leq M.$$

The parameter $\psi_m$ is employed here to define the boundary of channel phase feedback. Below we will discuss the value of $\psi_m$ in more detail.

The above quantized phase feedback scheme is considered to be one of the most efficient feedback schemes in the art. The M=2 and $L_2=2$ case has already been adopted by others in frequency division duplex (FDD) WCDMA transmit diversity Mode 1. Wideband Code-Division Multiple-Access (W-CDMA) is one of the main technologies for the implementation of third-generation (3G) cellular systems. It is based on a radio access technique proposed by ETSI Alpha group and the specifications were finalized 1999. Due to the feedback efficiency, we assume that these bits are reliably delivered to the transmitter 30 without any errors, and the feedback delay can be neglected. In a practical implementation, this can be accomplished by employing sufficient error control coding on the feedback channel.

The design target of the illustrated embodiment is to minimize the conditional pair wise codeword error probability $P_{kl/\tilde{b}}$, where $P_{kl/\tilde{b}}$ corresponds to the probability that the codeword $C_k$ is erroneously decoded as a different codeword $C_l$ given channel phase feedback $\tilde{b}$. Straightforward derivation on conditional probability yields $$P_{kl/\tilde{b}} = \int P(C_k \to C_l \mid h, \tilde{b}) P(h \mid \tilde{b}) dh. \quad (5)$$

In the above, $P(C_k \to C_l \mid h, \tilde{b})$ represents the conditional pair wise error probability when perfect channel state information is known at the receiver 32. Given the white Gaussian noise at the decoder, this error probability has an upper bounded given by $$P(C_k \to C_l \mid h, \hat{b}) \leq \frac{1}{2}\exp\left(-\frac{hD_{kl}h^H}{4\sigma^2}\right), \quad (6)$$

where $D_{kl} \triangleq (C_k - C_l)(C_k - C_l)^H$.

Using polar coordination, the upper bound is rewritten as:

$$\frac{1}{2}\exp\left(-\frac{rD(\exp(j\theta))D_{kl}D(\exp(-j\theta))r^T}{4\sigma^2}\right).$$

The term $P(h/\tilde{b})$ denotes the conditional probability density function of the channel coefficients. We have $$P(h \mid \tilde{b}) = P(r \mid \theta, \tilde{b})P(\theta \mid \tilde{b}), \quad (7)$$

where $P(r/\theta, \tilde{b}) = P(r)$ can be easily obtained from the original complex Gaussian probability density function of h:

$$P(r \mid \theta, \hat{b}) = \frac{(2\pi)^{M/2}}{\sigma_h^M}\exp\left(-\frac{rr^T}{2\sigma_h^2}\right). \quad (8)$$

The conditional channel phase probability density function $P(\theta/\tilde{b})$ is given in (4). Combining these results and the Jacobian of h with respect to (r, θ), the error probability is upper bounded by $$P_{kl/\hat{b}} \leq \int\int_{\Omega}\int_{R_M^+} \frac{\left(\prod_{m=1}^{M} r_m\right)\exp\left(-\frac{rZ(\bar{\theta})r^T}{2\sigma_h^2}\right)P(\bar{\theta} \mid \hat{b})}{2(2\pi)^{-M/2}\sigma_h^M} dr d\bar{\theta},$$

where $Z(\bar{\theta}) = D(\exp(j\bar{\theta}))\left[I_M + \frac{D_{kl}\sigma_h^2}{2\sigma^2}\right]D(\exp(-j\bar{\theta}))$ and the integration regions are $$\Omega = \left\{ \begin{array}{l} (\theta_{21}, \ldots, \theta_{M1}), \theta_{m1} \in \\ \left[ \psi_m + \frac{2\hat{b}_m - 1}{2^{L_m}} \pi, \psi_m + \frac{2\hat{b}_m + 1}{2^{L_m}} \pi \right), 2 \leq m \leq M \end{array} \right\}, \quad (9)$$

$$R_M^+ = \{(r_1, \ldots, r_M), r_m \in [0, \infty), 1 \leq m \leq M\}.$$

To simplify this upper bound, we define $$v_1 = r_1, v = (1 \quad v_2 \quad \cdots \quad v_M) \triangleq \left( 1 \quad \frac{r_2}{r_1} \quad \cdots \quad \frac{r_M}{r_1} \right).$$

Combining the Jacobian of $(v_1, v)$ with respect to $r$, the integral becomes $$\int_\Omega \int_{R_{M-1}^+} \int_0^\infty \frac{v_1^{2M-1} \left( \prod_{m=2}^M v_m \right) \exp\left( -\frac{v_1^2 v Z(\bar{\theta}) v^T}{2\sigma_h^2} \right) P(\bar{\theta} \mid \hat{b})}{2(2\pi)^{-M/2} \sigma_h^M} dv_1 dv d\bar{\theta}. \quad (10)$$

Then defining $$y = v_1^2 \frac{v Z(\bar{\theta}) v^T}{2\sigma_h^2}$$

and ignoring the constant terms, the integral becomes $$\int_\Omega \int_{R_{M-1}^+} \frac{\left( \prod_{m=2}^M v_m \right) P(\bar{\theta} \mid \hat{b})}{(v Z(\bar{\theta}) v^T)^M} dv d\bar{\theta} \int_0^\infty y^{M-1} \exp(-y) dy. \quad (11)$$

The second integration term in (11) is simply given by $\int_0^\infty y^{M-1} \exp(-y) dy = (M-1)!$. Ignoring the constant terms, we reach the following coding gain metric (CGM) between a pair of codeword matrices:

$$CGM(C_k, C_l) = \int_\Omega \int_{R_{M-1}^+} \frac{\left( \prod_{m=2}^M v_m \right) P(\bar{\theta} \mid \hat{b})}{(v Z(\bar{\theta}) v^T)^M} dv d\bar{\theta}. \quad (12)$$

At this stage, we assume that the union bound technique can be applied here and the worst-case pair wise error probability dominates the error performance. Using the union bound assumption, we obtain the following design criterion for constructing the optimal code C:

$$C = \underset{\forall C}{\operatorname{argmin}} \max_{\forall (C_k, C_l) \in C} CGM(C_k, C_l).$$

The remaining problem is to find codes that accomplish this minimum worst-case coding gain metric. Unfortunately, the coding gain metric in (12) is not in closed-form. For common phase shift keying (PSK) constellations such as BPSK, QPSK, 8PSK, and for a system with four or less transmit antennas, we find that the coding gain metric can be evaluated through simple numerical methods. Moreover, when M=2, the calculation of coding gain metric can be further simplified. For the M=2 case, only one parameter $\hat{b}_2$ needs to be sent back to the transmitter 30. For the sake of simplicity, we denote $L = L_2$, $\psi = \psi_2$ and $$P(\bar{\theta} \mid \hat{b}) = P(\theta_{21} \mid \hat{b}_2) = \frac{2^L}{2\pi}.$$

Through straightforward derivation and ignoring the constant terms, the coding gain distance in (12) is simplified for the M=2 case as $$CGM(C_k, C_l) = \quad (13)$$

$$\int_{\psi + \frac{2\hat{b}_2 - 1}{2^L} \pi}^{\psi + \frac{2\hat{b}_2 + 1}{2^L} \pi} \left[ \frac{2}{(4ac - b^2)} - \frac{\arccos\left( \frac{b}{\sqrt{4ac}} \right) 2b}{(4ac - b^2)^{\frac{3}{2}}} \right] d\theta_{21},$$

where $$a = \left[ I_M + \frac{D_{kl} \sigma_b^2}{2\sigma^3} \right]_{11},$$

$$c = \left[ I_M + \frac{D_{kl} \sigma_b^2}{2\sigma^3} \right]_{22},$$

and $$b = 2\Re\left\{ \left[ I_M + \frac{D_{kl} \sigma_b^2}{2\sigma^3} \right]_{21} \exp(j\theta_{21}) \right\},$$

respectively. When M>2, we employ the following numerical algorithm to calculate coding gain metric:

Algorithm

Step 1.

Through simple manipulations, the original coding gain metric is reformulated such that its integration region is bounded.

$$CGM = \int_\Omega \int_{[0,1]^{M-1}} \left[ \frac{\left( \prod_{m=2}^M v_m \right) P(\bar{\theta} \mid \hat{b})}{(v Z(\bar{\theta}) v^T)^M} + \frac{P(\bar{\theta} \mid \hat{b})}{\left( \prod_{m=2}^M v_m^3 \right) (v_{inv} Z(\bar{\theta}) v_{inv}^T)^M} \right] dv d\bar{\theta}, \quad (14)$$

where $$v_{inv} = [1, v_2^{-1}, \ldots, v_M^{-1}].$$

Step 2.

Set n=0 and $CGM_0 = 0$.

Step 3.
Set n=n+1, calculate $$CGM_n = \max_{\forall (C_k, C_l)} \sum_{v_2 = \frac{1}{2_n} : \frac{1}{n}}^{\frac{2_n-1}{2_n}} \cdots \qquad (15)$$

$$\sum_{v_M = \frac{1}{2_n} : \frac{1}{n}}^{\frac{2_n-1}{2_n}} \sum_{\theta_{21} = \psi_2 + \frac{(2_n \hat{b}_2 - n + 1)\pi}{n 2^L} : \frac{2\pi}{n 2^L}}^{\psi_2 + \frac{(2_n \hat{b}_2 + n - 1)\pi}{n 2^L}} \cdots \sum_{\theta_{M1} = \psi_M + \frac{(2_n \hat{b}_M - n + 1)\pi}{n 2^L} : \frac{2\pi}{n 2^L}}^{\psi_M + \frac{(2_n \hat{b}_M + n - 1)\pi}{n 2^L}}$$

$$\left[ \frac{\left(\prod_{m=2}^{M} v_m\right) P(\bar{\theta}|\hat{b})}{(vZ(\bar{\theta}) v^T)^M} + \frac{P(\bar{\theta}|\hat{b})}{\left(\prod_{m=2}^{M} v_m^3\right)(v_{inv} Z(\bar{\theta}) v_{inv}^T)^M} \right].$$

Step 4.
A. If $$\left| \frac{CGM_n - CGM_{n-1}}{CGM_n} \right| < \gamma,$$

then stop. Otherwise, go back to Step 3. The parameter γ denotes the convergence threshold. Heuristically, we set a constant threshold γ=0.01.

B. The convergence of this algorithm can be easily proved through basic calculus derivations. The above numerical calculation may be time consuming, and there might be many other algorithms that are simpler than the above algorithm. The invention thus explicitly includes other algorithms which determine the coding gain metric by other routines. However, the coding gain metric evaluation only needs to be carried out once in the code construction stage. It does not increase the complexity of the system implementation. Therefore, we determine that the above algorithm is sufficient, although further simplification of the coding gain metric calculation is contemplated as being within the scope of the invention. The illustrated algorithm is thus expressly not considered as a limitation of the invention.

C. It is also worth mentioning that, because of the term $\sigma^2_h/\sigma^2$ in (12), the receive signal-to-noise ratio (SNR) plays an important role in the trellis code design. To have an optimal code, the SNR should also be sent back to the transmitter 30. Both the receiver 32 and transmitter 30 should maintain a large table which stores the different codes to be used at various SNRs. All these requirements increase implementation complexity. To avoid this, we design a series of codes for a constant $\sigma^2_h/\sigma^2$ and use it for all other values. Through a series of experiments, we find that $\sigma^2_h/\sigma^2=10$ is an appropriate constant. Below, we will use numerical results to demonstrate that this simplification has little effect on obtaining good codes. In fact, cophase space-time trellis codes (CPSTTC), which is the term for the codes generated by the invention, enjoy good performance at all SNRs.

Code Construction for Systems with Two Transmit Antennas

Set Partitioning and Code Construction

Figure 9:
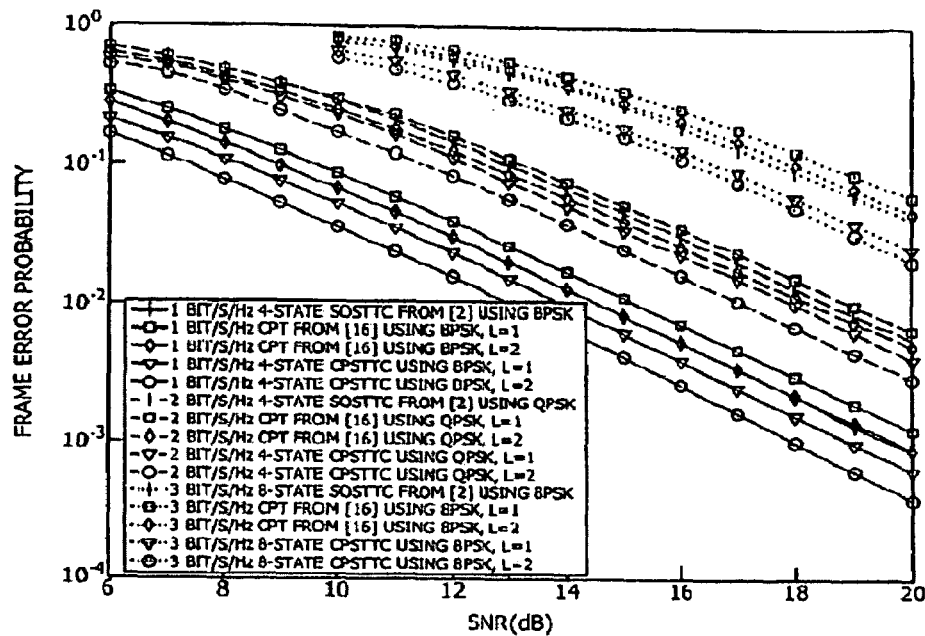
FIG. 9 is a graph of the performance rate in frame error probability verses SNR of various cophase space-time trellis codes for two transmitting antennas.
Figure 10:
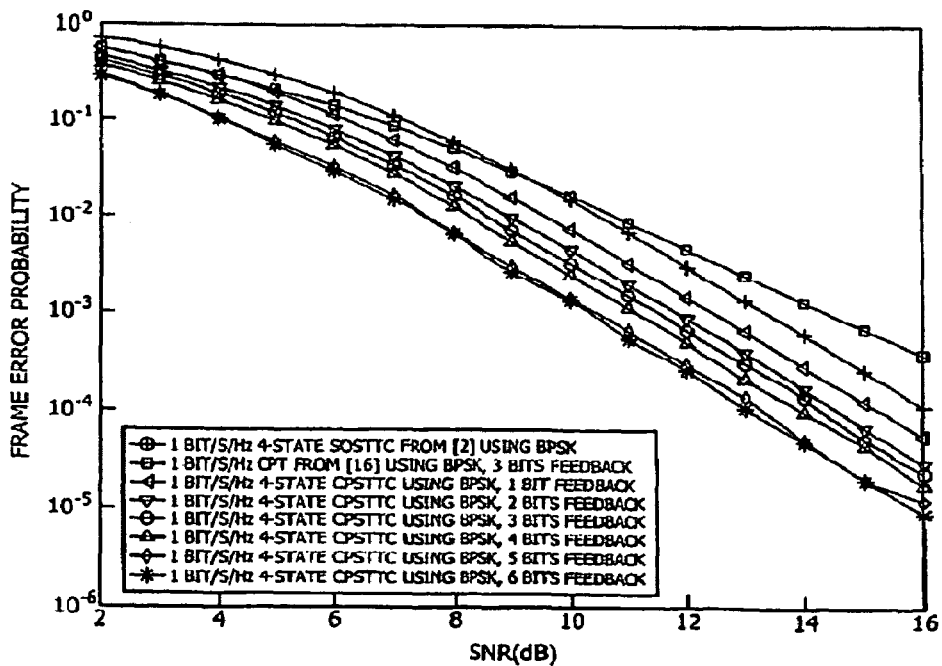
FIG. 10 is a graph of the performance rate of 1 bit/s/Hz cophase space-time trellis codes using BPSK for four transmitting antennas.

The system block diagram of cophase space-time trellis code, generally denoted by reference numeral 10, is depicted in FIG. 1. The various elements in FIG. 1 can be equivalently considered to each be elements of coding or code operation in a flow diagram, software modules in a computer system, or hardware/firmware circuits for performing the indicated function. Input bits 16 are provided to both an M-TCM encoder 18 and to a plurality of inner codes 12. The group of inner codes 12 share the same outer trellis code from M-TCM encoder 18. Each inner code 12 is suitable for one particular case of channel realization as illustrated in the examples of FIGS. 9 and 10. The proper inner code 12 is selected using the quantized phase feedback $\hat{b}$ denoted by the feedback arrow 14 at selection 20. The result is then transmitted through antenna 22 to a receiving antenna 24. A channel estimator 26 coupled to receiving antenna 24 generates the quantized channel phase feedback $\hat{b}$ represented by arrow 14 and provides its output to maximum likelihood (ML) decoder 28.

A major goal in our code construction is to maintain the simple structure of the original super orthogonal space time trellis codes 10. We find two classes of signal designs that enable symbol-by-symbol decoding. The first class is modified orthogonal designs. For the M=2 case, the codeword is given by the following orthogonal design $$A(c_1, c_2, \phi) = \begin{pmatrix} e^{j\phi} c_1 & -e^{j\phi} c_2^* \\ c_2 & c_1^* \end{pmatrix}, \qquad (16)$$

where $c_i = \exp(j 2 s_i \pi/N)$, i=1, 2 are symbols from an n-multiple phase shift keying (N-PSK) constellation, and $s_i$ is a member of the set [0, 1, ..., N-1], i=1, 2 are the input digital bits. The purpose of the rotation $e^{j\phi}$ is to enlarge the useable set for the inner code design.

The second class of signal designs in which the symbols are transmitted simultaneously from different antennas is:

$$B(c_1, c_2, \phi) = \begin{pmatrix} c_1 & c_2 \\ e^{j\phi} c_1 & e^{j\phi} c_2 \end{pmatrix}. \qquad (17)$$

Consistent with prior usages we name this class of codeword matrices as 'co-phase' designs. Unlike the orthogonal designs, the co-phase designs do not provide full spatial diversity. However, the newly defined coding gain metric criterion is different from the original determinant and rank criterion previously used. Full spatial diversity is no longer a necessary condition for good performance. With the partial channel state information at the transmitter 30, code words from $B(c_1, c_2, \phi)$ often provide better coding gain metric.

So far, the selection of the rotation angle $\phi$ in (16) and (17) has not been addressed. In general, we aim to avoid expanding the original signal constellation to maintain a simple implementation. Thus, $\phi = \pm \pi$ for BPSK and $\phi = k\pi/2$, $0 \leq k \leq 3$ for QPSK, and so on. However, when the cardinality of channel feedback $\hat{b}$ exceeds the cardinality of the corresponding N-PSK constellation, we have to exploit a wider range of rotation angles to achieve better performance. In this case, $\phi = 2\pi k/\max(2^L, N)$, $0 \leq k \leq \max(2^L-1, N-1)$.

In what follows, we perform set partitioning on the elements from $A(c_1, c_2, \phi)$ and $B(c_1, c_2, \phi)$ using the distance metric in (13). When grouping the different elements from $A(c_1, c_2, \phi)$ and $B(c_1, c_2, \phi)$ into different subsets, we demand that each subset only consists of elements from a single class of signal design with the same rotation $\phi$. The motivation of disallowing a mixture of elements from different designs in the same subset is to enable symbol-by-symbol decoding on the parallel branches of the trellis code, thus to reduce the overall decoding complexity. For clarification purposes, the pairwise distance between any two code words from the same signal design and with the same rotation φ will be called intra-coding gain metric. If two elements are from different signal designs or they have different rotation φ, the distance between them will be called inter-coding gain metric. For example, if $C_k$ is from $B(c_1, c_1, \pi)$, and $C_l$ is from $B(c_1, c_1, 0)$, then the distance between $C_k$ and $C_l$ is considered inter-coding gain metric. During the set partitioning procedure, only intra-coding gain metric will be used. On the other hand, the inter-coding gain metric will be most useful when analyzing the overall coding gain.

One important design parameter is the value of ψ in (13). An optimal strategy is to determine the value of ψ that can result in the smallest intra-coding gain metric for elements within certain subsets. In what follows, we provide several lemmas as guidelines for the optimal selection of ψ.

Lemma 1.
A. Without loss of generality, the value of ψ can be restricted to the region ψ contained within the set $[-\pi/2^L, \pi/2^L)$ for L bits of feedback.

Lemma 2.
A. The value of ψ does not affect the intra-coding gain metric values for the elements from the orthogonal designs $A(c_1, c_2, \phi)$.

Lemma 3.
For N-PSK constellation, if ψ=0, the elements within $$B\left(c_1, c_2, \frac{-\hat{b}_2 \pi}{2^{L-1}}\right)$$

accomplish the smallest worst-case intra-coding gain metric for $\hat{b}_2=0, \ldots, 2^L-1$. If $\psi=-\min(\pi/2^L, \pi/N)$, the elements in $$B\left(c_1, c_2, \frac{-\hat{b}_2 \pi}{2^{L-1}}\right) \text{ and } B\left(c_1, c_2, \frac{-\hat{b}_2 \pi}{2^{L-1}} + \min(\Pi/2^{L-1}, 2\Pi/N)\right)$$

accomplish the smallest worst-case intra-coding gain metric for $\hat{b}_2=0, \ldots, 2^L-1$.

Now we are ready to perform set partitioning on the elements of $A(c_1, c_2, \phi)$ and $B(c_1, c_2, \phi)$. The set partitioning is carried at different levels. At each level, codeword matrices are grouped into different subsets. Subsets on the same level shall have the same number of elements. It can be easily shown that increasing the Euclidean distance on any pair of symbols $(c_1, c_2)$ will result in a smaller coding gain metric for both signal designs. Thus a rule of thumb is that, if the Euclidean distance between two distinct symbol pairs $(c_1, c_2)$ and $(\hat{c}_1, \hat{c}_2)$ is large, $A(c_1, c_2, \phi)$ and $A(\hat{c}_1, \hat{c}_2, \phi)$ shall belong to the same subset. Following this guideline, the set partitioning results for BPSK constellation and L=1 case is given in FIG. 2. Based on Lemma 2 and Lemma 3, the parameter ψ is set to be ψ=0 for this set partitioning. At the different levels of the partition, the worst-case intra-coding gain metric values are also included in FIG. 2. Note that when the value of $\hat{b}_2$ changes, the set partitioning results change accordingly.

Based on the above set partitioning results, we systematically design a series of cophase space-time trellis codes. Straightforwardly, only subsets with relative small intra-CGMs are used to construct the inner codes. In addition, the parallel transitions diverging from or emerging into any state are from the same signal design with the same rotation angle.

At the decoder 28, a symbol-by-symbol algorithm can be employed to calculate the path metrics.

Figures 2, 3:
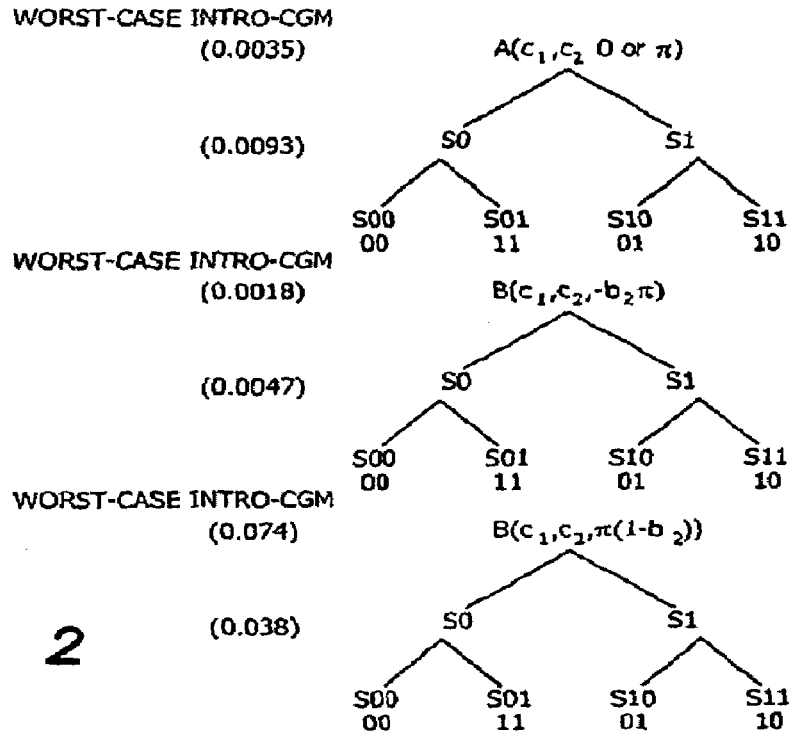
FIG. 2 is a table showing the set partitioning for $A(c_1, c_2, \phi)$ and $B(c_1, c_2, \phi)$ for the biphase shift keying (BPSK) constellation, and the case where L=1 bit of feedback.
FIG. 3 is a table showing the four state 1-bit/s/Hz space-time trellis code using BPSK or 2-bit/s/Hz space-time trellis code using quadrature phase shift keying (QPSK).

In this disclosure, we focus on the design of rate one cophase space-time trellis code. The first example is a simple cophase space-time trellis code where the BPSK constellation is used and there is L=1 bit of feedback. FIG. 3 depicts the corresponding four-state cophase space-time trellis code. This code can also be used as a 2 bits/s/Hz cophase space-time trellis code using QPSK for the L=1 case, and the optimal value for ψ is ψ=0. In this cophase space-time trellis code, a standard four-state trellis outer code is used regardless of the different inner codes. At 1 bit/s/Hz, there are four branches, including parallel branches, leaving from and merging into any state. Furthermore, branches on any neighboring states should have elements from two different signal designs or the same signal design with different rotations. Therefore, eight different elements are needed for the inner code. Using $\hat{b}_2=0$ and L=1 as an example, eight elements with the smallest intra-coding gain metric are chosen, i.e., $A(c_1, c_2, \phi)$ and $B(c_1, c_2, 0)$. These eight matrices build the corresponding inner code for the $\hat{b}_2=0$ case. Similarly, another inner code for $\hat{b}_2=1$ and L=1 can be designed with eight different elements: $A(c_1, c_2, 0)$ and $B(c_1, c_2, \pi)$. Using these two inner codes, we obtain the cophase space-time trellis code in FIG. 3 for the L=1 case.

Figure 4:
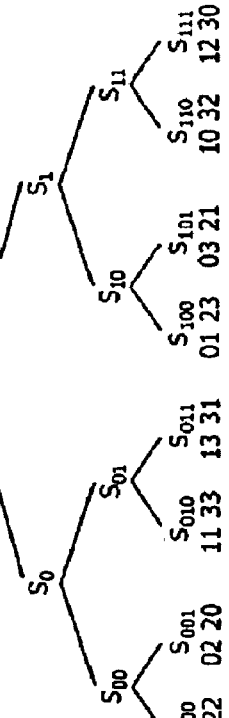
FIG. 4 is a table showing the set partitioning for $A(c_1, c_2, \phi)$ and $B(c_1, c_2, \phi)$ for quadrature phase shift keying (QPSK).

A similar strategy works for more number of feedback bits as well. Using the case of L=2 bits feedback as an example, the set partitioning results for QPSK constellation are depicted in FIG. 4. Note that based on Lemma 3, ψ=−π/4 is the optimal value for the elements in FIG. 4 to attain minimum intra-coding gain metric. The signal designs $$B\left(c_1, c_2, \frac{-\hat{b}_2 \pi}{2}\right) \text{ and } B\left(c_1, c_2, \frac{(1-\hat{b}_2) \pi}{2}\right)$$

are employed to construct the inner codes of a four-state cophase space-time trellis code 10 for QPSK as depicted in FIG. 3. In addition, the code in FIG. 3 can also be used as a 1 bit/s/Hz cophase space-time trellis code 10 using BPSK constellation for the L=2 case, where ψ=−π/4 is still optimal. As can be seen from these examples, the cophase space-time trellis code design is closely related to the number of feedback bits.

Figure 5:
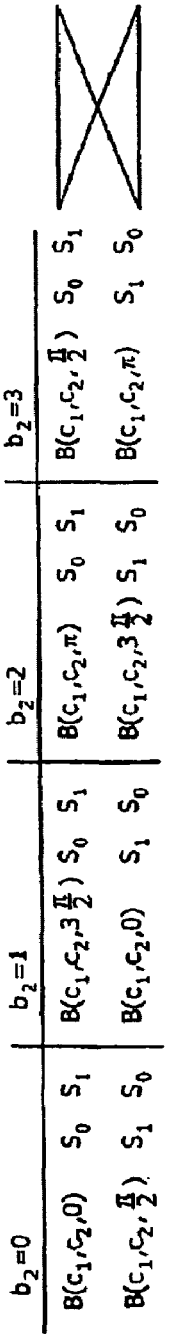
FIG. 5 is a table showing the two-state 1-bit/s/Hz cophase space-time trellis code using BPSK or 2-bit/s/Hz space-time trellis code using QPSK and quadrature phase shift keying (QPSK) for the L=2 bits of feedback.
Figure 6:
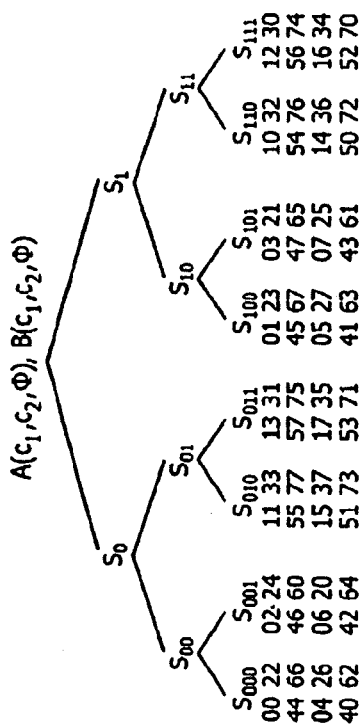
FIG. 6 is a table showing the set partitioning for octal phase shift keying (8PSK) constellation, and the case where L=1 bit of feedback and 8-state 3 bits/s/Hz cophase space-time trellis code using 8PSK constellation for L=1 and 2 bits of feedback.

FIG. 5 demonstrates the two-state trellis codes that run at 1 bit/s/Hz using BPSK and 2 bits/s/Hz using QPSK. These codes need two bits of feedback. Based on Lemma 3, the optimal value for ψ for these two-state codes is ψ=−π/4. FIG. 6 demonstrates the eight-state cophase space-time trellis codes 10 at 3 bits/s/Hz using 8PSK constellation. Assuming L=1, the set partitioning results for 8PSK constellation are also included in FIG. 6. In these 8PSK cophase space-time trellis codes 10, the optimal value for ψ is ψ=−π/8 for L=1, 2.

A key observation is that, our code construction uses a mixture of two classes of matrix designs, whereas the codes in the prior art use only one class. With a much larger set of elements available, our codes use only the elements that are more suitable for each channel situation, hence providing larger coding gains.

B. Coding Gain Analysis

Below, we provide a brief analysis of the coding gain for the above cophase space-time trellis codes 10. Most of our derivations focus on specific examples. However, the method is general and straightforward enough to be applied to the other cophase space-time trellis codes 10. We study the error events with path length two and three separately.

1) Error Events with Path Length of Two:

We start with the simplest two-state trellis code in FIG. 5. The intra-coding gain metric for the parallel transitions at each state is known based on the set partitioning results. For non-parallel transitions, two distinct code words may differ in at least two trellis transitions. We study a specific case where the first codeword stays at zero-state, whereas the second codeword diverges from the zero-state in the first transition and remerges into the zero-state in the second transition. The corresponding codeword difference matrix is given by:

$$D_{kl} = \begin{pmatrix} D_1 & D_2 \end{pmatrix} \begin{pmatrix} D_1^H \\ D_2^H \end{pmatrix} = D_1 D_1^H + D_2 D_2^H, \quad (18)$$

where D1 and D2 represent the difference matrices of the first and second transitions, respectively. From the trellis diagram in FIG. 5, assuming $b_2 = 0$ and BPSK constellation, we have:

$$D_1 = \begin{pmatrix} \Delta c_1 & \Delta c_2 \\ \Delta c_1 & \Delta c_2 \end{pmatrix}, D_2 = \begin{pmatrix} \Delta c_3 & \Delta c_4 \\ c_3 - j\hat{c}_3 & c_4 - j\hat{c}_4 \end{pmatrix}, \quad (19)$$

where $\Delta c_i = c_i - \hat{c}_i$ and $c_i$, $\hat{c}_i$, $i=1,\ldots 4$ are the symbols from two distinct code words $C_k$, $C_l$, respectively. The combination of the different values of $c_i$ and $\hat{c}_i$ results in different $D_{kl}$ matrices. After a brute force calculation on the pair wise coding gain metric of all different $D_{kl}$ matrices using (13), we obtain the pair of code words that generate the largest inter-coding gain metric as $$C_k = \begin{pmatrix} 1 & 1 & 1 & 1 \\ 1 & 1 & 1 & 1 \end{pmatrix}, C_l = \begin{pmatrix} -1 & 1 & -1 & 1 \\ -1 & 1 & -i & i \end{pmatrix}. \quad (20)$$

The corresponding coding gain metric value is $3.43 \times 10^{-4}$. Following the same procedure, the worst-case pair wise inter-coding gain metric for code words that originate from state one is also $3.43 \times 10^{-4}$. Comparing with the worst-case intra-coding gain metric $2.36 \times 10^{-4}$ for the parallel path, obviously the error paths with two transitions are the dominate error events. Similar results are obtained for inter-coding gain metric for the case of $b_2 \neq 0$.

In the same way, we also calculate the worst-case coding gain metric values for the codes using QPSK constellation in FIG. 5. The worst-case intra-coding gain metric on parallel transitions is $9.12 \times 10^{-4}$, while the maximum pair wise inter-coding gain metric on error events with path length of two is $1.2 \times 10^{-3}$. Therefore, the error events with two transitions still dominant the error performance for the codes using QPSK constellation.

2) Error Events with Path Length of Three:

We first examine the four-state codes in FIG. 3 for L=1, $b_2 = 0$, and BPSK constellation. The intra-coding gain metric for the parallel transitions is $9.3 \times 10^{-4}$ for the orthogonal designs in (16) and $4.7 \times 10^{-4}$ for the co-phase designs in (17). For non-parallel transitions, based on the trellis structure in FIG. 3, two code words may differ in at least three trellis transitions. We discuss the specific case where the first codeword stays at the zero-state path, and the second codeword follows the $0 \to 1 \to 2 \to 0$ path. The corresponding codeword difference matrix is simply given by:

$$D_1 = \begin{pmatrix} \Delta c_1 & \Delta c_2 \\ \Delta c_1 & \Delta c_2 \end{pmatrix}, D_2 = \begin{pmatrix} \Delta c_3 & c_4 + \hat{c}_4^* \\ c_3 - \hat{c}_4 & c_4 - \hat{c}_3^* \end{pmatrix}, D_3 = \begin{pmatrix} \Delta c_5 & \Delta c_6 \\ \Delta c_5 & \Delta c_6 \end{pmatrix}$$

and $c_i$, $\hat{c}_i$, $i=1,\ldots 6$ are the symbols from two distinct code words $C_k$, $C_l$, respectively. After an exhaustive search, we obtain the pair of code words that generate the largest inter-coding gain metric as $$C_k = \begin{pmatrix} 1 & 1 & 1 & 1 & 1 & 1 \\ 1 & 1 & 1 & 1 & 1 & 1 \end{pmatrix}, C_l = \begin{pmatrix} -1 & 1 & 1 & -1 & -1 & 1 \\ -1 & 1 & 1 & 1 & -1 & 1 \end{pmatrix}.$$

The corresponding coding gain metric value is $3.5 \times 10^{-4}$. Overall, the worst-case coding gain metric for this case is $9.3 \times 10^{-4}$ and is obtained by parallel transitions using orthogonal designs. Note that the four state super orthogonal space time trellis code in prior art would result in the same worst-case coding gain metric. However, the cophase space-time trellis codes 10 still enjoy better performance because only half of the parallel transitions experience the same worst case coding gain metric compared to the super orthogonal space time trellis code in the prior art. The other half of the parallel transitions use matrices from the co-phase designs, which benefit from a much smaller intra-coding gain metric. Therefore, the distance spectrum of cophase space-time trellis code 10 is better than that of the super orthogonal space time trellis codes when feedback bits are available.

We repeat the above procedure for L=2 bits of feedback. It is observed that the worst-case intra-coding gain metric on parallel transitions is $2.4 \times 10^{-4}$. The worst-case inter-coding gain metric for error events with path length of three is $1.7 \times 10^{-4}$. Thus, the error events of the parallel transitions still dominant the error performance for the L=2 case. In the same way, we also evaluate the worst-case coding gain metric for the codes in FIG. 3 using QPSK constellation. The maximum pair wise coding gain metric is $3.5 \times 10^{-3}$ for L=1 and is attained by parallel transitions using orthogonal designs. For the L=2 case, the maximum pair wise coding gain metric is $9.1 \times 10^{-4}$ and is attained by parallel transitions using co-phase designs. There are a few computer search algorithms to find the best space time trellis codes. Ideally, the same algorithms are applicable to design better cophase space-time trellis codes 10. However, as the constellation expands and the number of states increases, the computational complexity grows exponentially. In this case, the original coding gain distance in (13) should be further simplified to speed up the computer search. Therefore, it is contemplated within the scope of the invention that different searches to find the optimal cophase space-time trellis codes 10 for different trellises and rates could be equivalently substituted.

Code Design for More than Two Transmit Antennas

Consider now extending the general approach above for designing cophase space-time trellis codes 10 to more than two transmit antennas 22. A major difference here is that there will be much more phase information available at the receiver 32. When the feedback channel 14 is severely band limited, the receiver 32 can only send back the most critical bits. An optimal design strategy would be the one that exploits the feedback channel 14 in the most efficient way. Hence, the object is to jointly design the feedback scheme as well as the corresponding trellis coding scheme, thus attaining maximum coding gain with the least amount of feedback. Below we demonstrate the construction of cophase space-time trellis codes 10 for a system with four transmit antennas using BPSK constellation.

Channel Phase Feedback and New Signal Designs

When no channel state information is available at the transmitter 30, the conventional space time block codes provide the highest possible diversity gains, hence they are the best candidates for the inner codes. For four transmit antennas, a rotated 4×4 orthogonal design for the BPSK constellation is presented:

$$A\begin{pmatrix} c_1, c_2, c_3, c_4, \\ \phi_1, \phi_2, \phi_3 \end{pmatrix} = \begin{pmatrix} c_1 e^{j\phi_1} & -c_2 e^{j\phi_1} & -c_3 e^{j\phi_1} & -c_4 e^{j\phi_1} \\ c_2 e^{j\phi_2} & c_1 e^{j\phi_2} & c_4 e^{j\phi_2} & -c_3 e^{j\phi_2} \\ c_3 e^{j\phi_3} & -c_4 e^{j\phi_3} & c_1 e^{j\phi_3} & c_2 e^{j\phi_3} \\ c_4 & c_3 & -c_2 & c_1 \end{pmatrix}, \quad (22)$$

where the parameters $\phi_1$, $\phi_2$, $\phi_3$ are introduced to expand the original orthogonal designs without altering the orthogonality. When there is sufficient amount of channel phase feedback, the co-phase designs accomplish better intra-coding gain metric and hence become better candidates for the inner codes. For four transmit antennas, the co-phase design is given by:

$$B\begin{pmatrix} c_1, c_2, c_3, c_4, \\ \phi_1, \phi_2, \phi_3 \end{pmatrix} = \begin{pmatrix} c_1 & c_2 & c_3 & c_4 \\ c_1 e^{j\phi_1} & c_2 e^{j\phi_1} & c_3 e^{j\phi_1} & c_4 e^{j\phi_1} \\ c_1 e^{j\phi_2} & c_2 e^{j\phi_2} & c_3 e^{j\phi_2} & c_4 e^{j\phi_2} \\ c_1 e^{j\phi_3} & c_2 e^{j\phi_3} & c_3 e^{j\phi_3} & c_4 e^{j\phi_3} \end{pmatrix}. \quad (23)$$

For the four-antenna cophase space-time trellis codes 10 in this embodiment, the rotation angles $\phi_1, \ldots, \phi_{M-1}$ in the co-phase designs satisfy the simple relationship $$\varphi_i = \frac{-2\pi \hat{b}_{i+1}}{2^{L_{i+1}}},$$

and the parameter $\psi_i$ is set to be $\psi_i=0$ for $i=2, \ldots, M$. Following the same derivation in Lemma 3, it can be shown that these rotation angles guarantee the smallest intra-coding gain metric for the elements of $$B\left(c_1, c_2, c_3, c_4, \frac{-2\pi \hat{b}_2}{2^{L_2}}, \frac{-2\pi \hat{b}_3}{2^{L_3}}, \frac{-2\pi \hat{b}_4}{2^{L_4}}\right).$$

When there are only a few feedback bits available, neither one of the two signal designs provide the best coding gain metric. In what follows, we introduce several new signal designs for different feedback scenarios. We use a fixed constant $\psi i=0$ in these new signal designs. Setting $\psi_i=0$ may be a sub-optimal solution. However, as we demonstrate below, all these new signal designs provide significant performance gains. The search of optimal $\psi_i$ is considered as being within the scope of the invention. Note that, without loss of generality, we assume that the number of feedback bits satisfy the simple relation $L_2 \geq \max(L_3, L_4)$.

1) 1-Bit Feedback Scenario:

In this case, $L_2=1$ and $L_3=L_4=0$. We construct a new signal design for this feedback scenario:

$$C(c_1, c_2, c_3, c_4, \phi_1) = \begin{pmatrix} c_1 & -c_2 & -c_3 & -c_4 \\ c_1 e^{j\phi_1} & -c_2 e^{j\phi_1} & -c_3 e^{j\phi_1} & -c_4 e^{j\phi_1} \\ c_2 & c_1 & c_4 & -c_3 \\ c_3 & -c_4 & c_1 & c_2 \end{pmatrix}. \quad (24)$$

The matrix in (24) is constructed in two steps. First, we remove the last row from the original 4×4 orthogonal design. Then we expand the first row into two rows, the signals on the second row are just rotated versions of the signals on the first row. By setting $\phi_1=-\pi\hat{b}_2$, the signals on the first two antennas essentially form a co-phase design, and antennas 1 and 2 are combined into a 'virtual' antenna. Finally, the signals from the 'virtual' antenna and signals from antennas 3 and 4 form a 3-dimensional orthogonal design. The new design in (24) is a mixture of co-phase designs and orthogonal designs. The object is to reduce the diversity order of (22) by one, and allocate more transmit energy on the 'good' transmit direction. At the receiver 32, the 4-by-1 vector channel is reduced to a 3-by-1 vector channel with channel coefficients $[h_1+h_2 e^{j\phi_1}, h_2, h_3]$. Thus, a symbol-by-symbol algorithm for orthogonal designs can be employed to calculate the path metric on the parallel branches. We apply phase rotations $\phi_2$ and $\phi_3$ on the 'virtual' antenna and the third antenna, respectively, i.e.

$$C(c_1, c_2, c_3, c_4, \phi_1, \phi_2, \phi_3) = \qquad (25)$$

$$\begin{pmatrix} c_1 e^{j\phi_2} & -c_2 e^{j\phi_2} & -c_3 e^{j\phi_3} & -c_4 e^{j\phi_2} \\ c_1 e^{j\phi_1} e^{j\phi_2} & -c_2 e^{j\phi_1} e^{j\phi_2} & -c_3 e^{j\phi_1} e^{j\phi_3} & -c_4 e^{j\phi_1} e^{j\phi_2} \\ c_2 e^{j\phi_3} & c_1 e^{j\phi_3} & c_4 e^{j\phi_3} & -c_3 e^{j\phi_3} \\ c_3 & -c_4 & c_1 & c_2 \end{pmatrix},$$

where $\phi_i = 2n\pi/N$, $i=2, 3$, $n=0, \ldots, N-1$ for an N-PSK constellation. Note that the only purpose of $\phi_2$ and $\phi_3$ is to expand the signal design in (24) without altering the orthogonality.

2) Two-Bit Feedback Scenario:

There are several different ways to allocate the two feedback bits. A straightforward method is to use both bits to quantize $\theta_{21}$, i.e., $L_2=2$ and $L_3=L_4=0$. By setting $\phi_1=-\pi\hat{b}_2/2$, the signal design in (25) is directly applicable for this case. Another method sets $L_2=L_3=1$ and $L_4=0$. For this case, we define the following signal design:

$$D(c_1, c_2, c_3, c_4, \phi_1, \phi_2, \phi_3) = \qquad (26)$$

$$\begin{pmatrix} c_1 e^{j\phi_3} & c_2^* e^{j\phi_3} & c_3 e^{j\phi_3} & c_4^* e^{j\phi_3} \\ c_1 e^{j\phi_1} e^{j\phi_3} & c_2^* e^{j\phi_1} e^{j\phi_3} & c_3 e^{j\phi_1} e^{j\phi_3} & c_4^* e^{j\phi_1} e^{j\phi_3} \\ c_1 e^{j\phi_2} e^{j\phi_3} & c_2^* e^{j\phi_2} e^{j\phi_3} & c_3 e^{j\phi_2} e^{j\phi_3} & c_4^* e^{j\phi_2} e^{j\phi_3} \\ c_2 & -c_1^* & c_4 & -c_3^* \end{pmatrix},$$

where $\phi_i=-\pi \hat{b}_{i+1}$, $i=1, 2$, and $\phi_3=2n\pi/N$, $0 \leq n \leq N-1$ for an N-PSK constellation. We have used complex conjugate operator here because this signal design can also be used for complex constellations. These complex operators can be ignored for BPSK constellation. Obviously, the signals on antennas 1, 2, and 3 form a co-phase design, and the first three antennas are combined into a 'virtual' antenna. Signals from this 'virtual' antenna are combined with the signals from antenna 4 to create an orthogonal design on ($c_1$, $c_2$) and another orthogonal design on ($C_3$, $c_4$). The phase rotation $\phi_3$ is applied on the 'virtual' antenna. Its purpose is to expand the cardinality of this signal design. In this new design, the diversity order is further reduced by one, and more than half of the transmit energy is allocated on the 'virtual' antenna.

The last feedback scheme is to use one bit $\hat{b}_2$ to quantize $\theta_{21}$, and a new bit, $\hat{b}_{43}$, to quantize $\theta_{43}$. This feedback scheme is slightly different from the previous ones in the sense that the parameter $\theta_{43}$, instead of $\theta_{41}$ or $\theta_{31}$, is quantized. A direct consequence is a minor change in the calculation of coding gain metric in (12). First, the phase difference vector is rewritten as $\overline{\theta} = [0, \theta_{21}, \theta_{31}, \theta_{31} + \theta_{43}]$. Second, the integration region in (9) is changed into:

$$\Omega = \left\{ (\theta_{21}, \theta_{31}, \theta_{43}), \theta_{21} \in \left[ \frac{2\hat{b}_2 - 1}{2^{L_2}} \pi, \frac{2\hat{b}_2 + 1}{2^{L_2}} \pi \right], \right.$$

$$\left. \theta_{31} \in [-\pi, \pi), \theta_{43} \in \left[ \frac{2\hat{b}_{43} - 1}{2^{L_{43}}} \pi, \frac{2\hat{b}_{43} + 1}{2^{L_{43}}} \pi \right] \right\},$$

where $L_{43}$ denotes the number of bits that are used to quantize $\theta_{43}$. For this feedback scheme, we define a new signal design:

$$E(c_1, c_2, c_3, c_4, \phi_1, \phi_2, \phi_3) = \begin{pmatrix} c_1 e^{j\phi_3} & c_2^* e^{j\phi_3} & c_3 e^{j\phi_3} & c_4^* e^{j\phi_3} \\ c_1 e^{j\phi_1} e^{j\phi_3} & c_2^* e^{j\phi_1} e^{j\phi_3} & c_3 e^{j\phi_1} e^{j\phi_3} & c_4^* e^{j\phi_1} e^{j\phi_3} \\ c_2 & -c_1^* & c_4 & -c_3^* \\ c_2 e^{j\phi_2} & -c_1^* e^{j\phi_2} & c_4 e^{j\phi_2} & -c_3^* e^{j\phi_2} \end{pmatrix}, \quad (27)$$

where $\phi_1 = -\pi\hat{b}_2$, $\phi_2 = -\pi\hat{b}_{43}$, and $\phi_3 = 2n\pi/N$, $n = 0, \ldots, N-1$ for an N-PSK constellation. Obviously, the first two antennas are combined into 'virtual' antenna 1, and the other two antennas are combined into 'virtual' antenna 2. The signals from these two 'virtual' antennas are combined to create two orthogonal designs. The rotation $\phi_3$ has the same function as the rotation $\phi_3$ in (26).

3) Three or More Bits Feedback Scenarios:

A. Similar to the two-bit feedback case, there are many different feedback strategies. When $L_2 \leq 0$, the signal design $C(c_1, c_2, c_3, c_4, -2\hat{b}_2\pi/2L_2, \phi_2, \phi_3)$ is applicable. For $L_2 > 0$, $L_3 \leq 0$ case, both $C(c_1, c_2, c_3, c_4, -2\hat{b}_2\pi/2L_2, \phi_2, \phi_3)$ and $D(c_1, c_2, c_3, c_4, -2\hat{b}_2\pi/2L_2, -2\hat{b}_3\pi/2L_3, \phi_3)$ are applicable. When $L_2 > 0$, $L_3 = 0$, $L_{43} > 0$, both $C(c_1, c_2, c_3, c_4, -2\hat{b}_2\pi/2L_2, \phi_2, \phi_3)$ and $E(c_1, c_2, c_3, c_4, -2\hat{b}_2\pi/2L_2, -2\hat{b}_{43}\pi/2L_{43}, \phi_3)$ in (27) are applicable. When $L_2 > 0$, $L_3 > 0$, $L4 > 0$, the signal designs $B(c_1, c_2, c_3, c_4, -2\hat{b}_2\pi/2L_2, -2\hat{b}_3\pi/2L_3, -2\hat{b}_4\pi/2L_4)$, $C(c_1, c_2, c_3, c_4, -2\hat{b}_2\pi/2L_2, \phi_2, \phi_3)$ and $D(c_1, c_2, c_3, c_4, -2\hat{b}_2\pi/2L_2, -2\hat{b}_3\pi/2L_3, \phi_3)$ are applicable. Finally, the signal design $A(c_1, c_2, c_3, c_4, \phi_1, \phi_2, \phi_3)$ is always a candidate for the inner code design since it does not rely on any channel phase feedback.

B. Using above examples, we have defined a series of signal designs. All of them accomplish a natural combination of co-phase designs and orthogonal designs. The underlying principle is to combine two or more antennas into a 'virtual' antenna using co-phase designs, then combine the signals from the 'virtual' antenna with the signals from the rest of the antennas to form an orthogonal design. This new strategy can be easily extended to orthogonal designs or quasi-orthogonal designs for more than four transmit antennas. Finally, since no power loading is required in these codeword matrices, all these signal designs enjoy low peak-to-average power ratio.

C. Set Partitioning and Code Construction

D. We have presented a series of feedback bit allocation schemes and corresponding signal designs. Obviously, some of the signal designs provide better coding gain compared to the others. To pick the right combination, we adopt the same principle that we have used to construct the codes for two transmit antennas. We carry out set partitioning on all the candidate signal designs. Based on the results, only the ones that provide small intra-coding gain metric are used in the inner codes.

Figure 7:
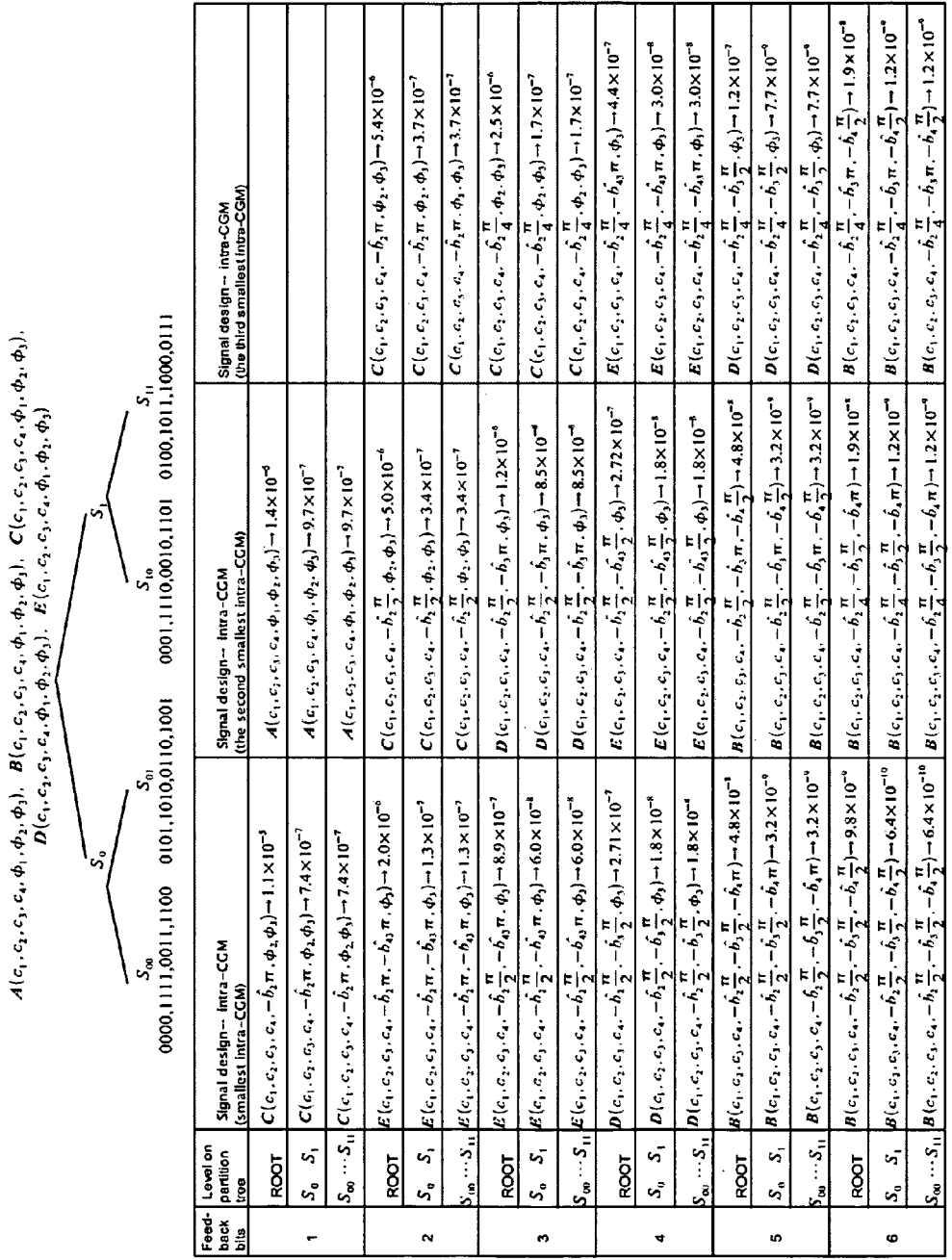
FIG. 7 is a table showing the set partitioning for four transmit antennas using BPSK constellation.

E. For the $L \leq 6$ cases, the set partitioning results for BPSK constellation is provided in FIG. 7. For illustration only three signal designs are presented that provide the smallest intra-coding gain metric. A significant byproduct of the above signal designs is that they can also be used in non-trellis coded systems. Using the intra-coding gain metric values at the root level of the partition tree, the receiver 32 can pick the best signal designs, as well as the corresponding feedback scheme. Without the outer M-TCM encoder 18, these signal designs can be readily used as space time block codes. A major contribution of these new block codes is that the coding scheme is jointly defined with the channel phase feedback scheme, which is not addressed by the precoding schemes in the prior art. Furthermore, the preferred symbol-by-symbol decoding algorithm is applicable for all these new block codes.

F. The trellis code construction based on the set partitioning results is straightforward. For any given trellis, we assign the signal designs with the smallest intra-coding gain metric on the different states using the Ungerboeck rules, which are:

U1 Members of the same largest partition are assigned to parallel transitions.

U2 Members of the next larger partition are assigned to "adjacent" transitions, i.e. transitions stemming from, or merging into the same node.

U3 All the signals are used equally often.

G. In the meantime, the bit allocation of the feedback scheme is also determined. As an example, FIGS. 8*a* and 8*b* depicts the two-state and four-state cophase space-time trellis codes 10 respectively for transmitting 1 bit/s/Hz using BPSK for $L \leq 6$ cases. The bit assignment on the feedback channel is also included in FIGS. 8*a* and 8*b*.

Numerical Simulations

Consider the performance of the cophase space-time trellis codes 10 through numerical simulations. We compare our results with two other related schemes. The first scheme is the super orthogonal space time trellis codes from the prior art and the second scheme is the cophase transmission scheme in the prior art. In these simulations, the SNR is defined as the receive SNR of a super orthogonal space time trellis code system. For the simulations to be fair, the transmit energy for the different schemes is the same as the transmit energy of the super orthogonal space time trellis code scheme.

In the first simulation, the system consists of two transmit antennas and one receive antenna, and each frame consists of 130 transmissions. FIG. 9 shows the frame error probability versus SNR for transmitting 1 bit/s/Hz using BPSK, 2 bits/s/Hz using QPSK, and 3 bits/s/Hz using 8PSK. In all these cases, the cophase space-time trellis codes 10 uniformly out-perform the other schemes. As more feedback bits become available, more performance gain is observed.

In the second simulation, we examine a system with four transmit antennas and one receive antenna. For the 4-TCM codes above, each frame consists of 132 transmissions. FIG. 10 depicts the frame error probability versus SNR for the four-state codes in FIG. 8b. It can be clearly seen that, with more feedback, the cophase space-time trellis codes 10 enjoy more performance gain.

We also perform numerical simulations for the two-state codes in FIG. 8a, and similar results are observed. For both two-state codes and four-state codes in FIGS. 8a and 8b, about 3 dB gain is accomplished with merely 6 bits feedback compared to the super orthogonal space time trellis codes in the prior art.

It can now be appreciated that we have constructed a new class of codes called co-phase space time trellis codes. The proposed coding scheme is based on a practical assumption that only a few quantized channel phase feedback bits are available at the transmitter 30. A transmission scheme that effectively combines the recent super orthogonal space time trellis codes with the simple cophase transmission scheme was proposed. A new space-time code design criterion was derived based on quantized channel phase feedback. The new design criterion was used for set partitioning of several classes of matrix designs. These matrix designs include both orthogonal designs as well as co-phase designs. For a system with four transmit antennas, we also developed several new signal designs by means of combining a group of antennas into 'virtual' antennas using co-phase designs. Finally, the set partitioning results were used to construct the new cophase space-time trellis codes. Our code design strategy is general enough to be applied to different number of feedback bits and systems with different number of transmit antennas.

Numerical simulations have demonstrated significant gain over the most recent open-loop transmission schemes as well as the close-loop cophase transmission schemes. In addition, the proposed coding scheme enjoys low peak-to-average power ratio, simple decoding, and easy implementation without complicated eigen-analysis.

The invention includes within its cope the extension of this idea to super quasi-orthogonal space time trellis codes. Preliminary results show that full rate cophase space-time trellis codes based on quasi-orthogonal designs accomplish significant performance gain compared to the prior art super quasi-orthogonal space time trellis codes.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for wireless communication in a communication apparatus comprising:

generating inner and outer codes in a computer based on channel state information input from a transmitter by generating high-performance trellis codes in the computer;

concatenating different inner codes with different outer codes in the computer; and using the generated inner and outer codes in the computer to control wireless communication by the communication apparatus, where generating high-performance trellis codes comprises generating space-time trellis codes by performing set partitioning on a plurality of classes of signal designs to generate in the computer a series of inner codes, each of the series of inner codes being optimized by channel phase feedback of the communication apparatus, and concatenating in the computer each inner code with a multiple trellis coded modulated (M-TCM) outer code to provide a complete space-time trellis code as a cophase space-time trellis code to control the communication apparatus.

2. An apparatus for wireless communication comprising:

means for generating inner and outer codes based on channel state information available at a transmitter which are high-performance trellis codes;

means for concatenating different inner codes with different outer codes; and means for using the generated inner and outer codes for wireless communication;

where the means for generating inner and outer codes based on channel state information available at a transmitter which are high-performance trellis codes comprises means for generating space-time trellis codes by performing set partitioning on a plurality of classes of signal designs to generate a series of inner codes, each of the series of inner codes being optimized by channel phase feedback, and means for concatenating each inner code with a multiple trellis coded modulated (M-TCM) outer code to provide a complete space-time trellis code as a cophase space-time trellis code.

3. A method for wireless closed-loop communication in a communication apparatus including at least one transmitter and receiver comprising:

generating quantized channel phase information in a computer for a fading channel at a receiver in the communication apparatus;

feeding back the quantized channel phase information to the transmitter in the communication apparatus, generating an inner code in the computer by selection of one from a plurality of inner codes generated in the computer using the feedback of the quantized channel phase information from the communication apparatus, each of the plurality of inner codes being optimized by channel phase feedback of the communication apparatus;

generating cophase space-time trellis codes in the computer by concatenating a selected inner code and an outer code provided to a transmitter in the communication apparatus, where the outer code is generated by multiple trellis code modulation in the computer;

providing coding gain for improved space-time transmission by the communication apparatus;

transmitting the generated concatenated inner and outer codes in the communication apparatus;

receiving the generated concatenated inner and outer codes at the receiver in a computing circuit from which receiver the quantized channel phase information was generated; and decoding the received concatenated inner and outer codes in the computing circuit at the receiver.

4. The method of claim 3 where generating cophase space-time trellis codes by concatenating inner and outer codes comprises generating the plurality of inner codes in the computer by systematically set partitioning a plurality of classes of space-time signal designs.

5. The method of claim 3 where generating quantized channel phase information and generating space-time trellis codes by concatenating inner and outer codes are performed in combination in the computer to attain maximum coding gain with the least amount of feedback.

6. The method of claim 3 further comprising a plurality of intercommunicating transmitters and receivers, each having a corresponding antenna, and further comprising combining the antenna of one of the intercommunicating transmitters with the antenna of one of the intercommunicating receivers to define a virtual antenna by means of the generated cophase space-time trellis codes, combining the signals from the virtual antenna with the signals from the remainder of the corresponding antennas to form orthogonal or quasi-orthogonal cophase space-time trellis codes each associated with codeword matrices for the corresponding antennas of the plurality of transmitters, wherein the orthogonal or quasi-orthogonal cophase space-time trellis codes are each characterized by low peak-to-average power ratio due to no required power loading in the corresponding codeword matrices.

7. The method of claim 3 where generating an inner code in the computer by selection of one from a plurality of inner codes generated using the feedback of the quantized channel phase information from the communication apparatus where each of the plurality of inner codes is optimized by channel phase feedback of the communication apparatus comprises:

generating the optimal inner code C to minimize the conditional pair wise codeword error probability $P_{kl/\hat{b}}$, where $P_{kl/\hat{b}}$ corresponds to the probability that the codeword $C_k$ is erroneously decoded as a different codeword $C_l$ given channel phase feedback $\hat{b}$, and thereby constructing the optimal inner code C, where CGM is a coding gain metric:

$$C = \underset{\forall C}{arg\min} \ \underset{\forall (C_k, C_l) \in C}{\max} CGM(C_k, C_l)$$

by finding the minimum worst-case coding gain metric.

8. An apparatus for wireless closed-loop communication comprising:

a transmitter with a transmit antenna; and a receiver with a receive antenna;

where the receiver is configured to generate quantized channel phase information for a fading channel between the receiver and transmitter, which quantized channel phase information is fed back to the transmitter, where the transmitter includes a means for generating a plurality of inner codes and where the means selects one of a plurality of inner codes using the feedback of the quantized channel phase information, where the means optimizes each of the plurality of inner codes by channel phase feedback of the communication apparatus and where the means generates cophase space-time trellis codes by concatenating a selected inner code and an outer code at a transmitter, where the means generates outer code by multiple trellis code modulation, where the means provides coding gain to improve space-time transmission, and where the transmitter transmits selected inner and outer codes to the receiver where the received codes are decoded.

9. The apparatus of claim 8 where in the transmitter the means generates the plurality of inner codes by systematically set partitioning a plurality of classes of space-time signal designs.

10. The apparatus of claim 8 where the receiver includes a means for generating the quantized channel phase information and where in the transmitter the means generates space-time trellis codes by concatenating inner and outer codes in combination to attain maximum coding gain with the least amount of feedback.

11. The apparatus of claim 8 further comprising a plurality of intercommunicating transmitters and receivers, each having a corresponding transmit or receive antenna respectively, and where the antenna of one of the intercommunicating transmitters with the antenna of one of the intercommunicating receivers to define a virtual antenna by means of the generated cophase space-time trellis codes, so that the signals from the virtual antenna are combined with the signals from the remainder of the corresponding antennas to form orthogonal or quasi-orthogonal cophase space-time trellis codes each associated with codeword matrices for the corresponding antennas of the plurality of transmitters, wherein the orthogonal or quasi-orthogonal cophase space-time trellis codes are each characterized by low peak-to-average power ratio due to no required power loading in the corresponding codeword matrices.

12. The apparatus of claim 8 where the means for generating an inner code in the computer by selection of one from a plurality of inner codes generated using the feedback of the quantized channel phase information from the communication apparatus where each of the plurality of inner codes is optimized by channel phase feedback of the communication apparatus comprises:

means for generating the optimal inner code C to minimize the conditional wise codeword error probability $P_{kl/\tilde{b}}$, where $P_{kl/\tilde{b}}$ corresponds to the probability that the codeword $C_k$ is erroneously decoded as a different codeword $C_l$ given channel phase feedback $\tilde{b}$, and thereby constructing the optimal inner code C, where CGM is a coding gain metric:

$$C = \underset{\forall C}{\text{argmin}} \; \underset{\forall (C_k, C_l) \in C}{\max} CGM(C_k, C_l)$$

by finding the minimum worst-case coding gain metric.

* * * * *

UNITED STATES PATENT AND TRADEMARK OFFICE
CERTIFICATE OF CORRECTION

PATENT NO. : 7,599,419 B2
APPLICATION NO. : 11/332019
DATED : October 6, 2009
INVENTOR(S) : Jafarkhani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Twenty-eighth Day of September, 2010

David J. Kappos
*Director of the United States Patent and Trademark Office*